(12) United States Patent
Shao et al.

(10) Patent No.: US 7,828,110 B2
(45) Date of Patent: Nov. 9, 2010

(54) CONSTRAINT MECHANISM FOR STEERING DEVICE OF FOUR-WHEELED VEHICLE

(75) Inventors: Chien-Neng Shao, Kaohsiung (TW); Yen-Hsiu Lee, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 580 days.

(21) Appl. No.: 11/858,909

(22) Filed: Sep. 21, 2007

(65) Prior Publication Data

US 2009/0078490 A1    Mar. 26, 2009

(51) Int. Cl.
*B62D 3/12* (2006.01)
(52) U.S. Cl. .............. 180/428; 74/422; 280/93.514; 280/779
(58) Field of Classification Search .......... 74/422, 74/492, 496–500; 180/427, 428; 280/93.514, 280/93.515, 779; *B62D 3/12*
See application file for complete search history.

(56) References Cited

U.S. PATENT DOCUMENTS

| | | | |
|---|---|---|---|
| 4,127,186 A * | 11/1978 | Koyano et al. | 180/428 |
| 5,788,009 A * | 8/1998 | Lee | 180/428 |
| 6,330,929 B1 * | 12/2001 | Gierc et al. | 180/428 |
| 6,467,566 B1 * | 10/2002 | Harer et al. | 180/417 |
| 6,644,430 B2 * | 11/2003 | Harer et al. | 180/428 |
| 6,848,536 B2 * | 2/2005 | Namgung | 180/444 |
| 6,851,508 B2 * | 2/2005 | Fukuda et al. | 180/444 |
| 7,401,789 B2 * | 7/2008 | Harer et al. | 277/585 |

FOREIGN PATENT DOCUMENTS

| | | | |
|---|---|---|---|
| DE | 10222761 A1 * | 12/2003 | |
| JP | 08169350 A * | 7/1996 | |
| JP | 08207790 A * | 8/1996 | |
| JP | 11198827 A * | 7/1999 | |
| JP | 11208486 A * | 8/1999 | |
| JP | 2007015516 A * | 1/2007 | |
| WO | WO 2005028284 A1 * | 3/2005 | |

* cited by examiner

*Primary Examiner*—Paul N Dickson
*Assistant Examiner*—Laura Freedman
(74) *Attorney, Agent, or Firm*—Leong C. Lei

(57) ABSTRACT

A steering device for steering front wheels of a four-wheeled vehicle is disclosed, comprising a steering wheel, a steering column, a lower column, and a steering gear box. The lower column is coupled via universal joints to the steering column and the steering gear box. The steering gear box includes a housing in which a rack and a screw rod are accommodated. The rack has an end coupled via a spherical joint to a tie rod, which is jointed to the front wheel. The spherical joint includes an anti-loosening washer. The housing has an inside surface forming a step over which a sleeve is fit for being engageable with the anti-loosening washer of the spherical joint to form a constraint to an inward travel of the spherical joint of the tie rod into the housing so as to set a constraint to steering angle of the front wheel.

5 Claims, 7 Drawing Sheets

CONSTRAINT MECHANISM FOR STEERING DEVICE OF FOUR-WHEELED VEHICLE

BACKGROUND OF THE INVENTION (a) Technical Field of the Invention

The present invention relates to a constraint mechanism for a steering device of a four-wheeled vehicle, and in particularly to such a mechanism that allows easy modification or change of setting for maximum steering angle of front wheels of the vehicle.

(b) Description of the Prior Art

A four-wheeled vehicle is commonly provided with a steering device at a location associated with the driver seat. As shown in FIGS. 1 and 2, a conventional steering device, generally designated at 1, comprises a steering wheel 11, a steering column 12, a lower column 14, and a steering gear box 15. The steering wheel 11 is mounted to an upper end of the steering column 12 and the lower column 14 is coupled to a lower end of the steering column 12 via a universal joint 13. A lower end of the lower column 14 is coupled, via another universal joint 13, to a screw rod 152 of the steering gear box 15. The steering gear box 15 comprises a hollow housing 151 accommodating therein a rack 153 and the screw rod 152. Opposite ends of the rack 153 are respectively connected to steering tie rods 16, which are coupled to kingpins of front wheels of the four-wheeled vehicle. Thus, when the steering wheel 11 is rotated, the steering column 12 and the lower column 14 are rotated simultaneously. This causes the steering gear box 15 to move the tire rods 16 in a left-right direction and thus changes the angular orientation of the front wheels and in turn changing the moving direction of the vehicle.

The angular displacement or steering angle of the front wheels is subjected limitation or constraint imposed by the steering device 1 and this will be explained with particular reference to FIG. 2. Since the structures on the opposite sides of the steering gear box 15 are substantially the same, in the following description, reference is made only to the structure on one side (the left side) of the steering gear box 15. As shown in FIG. 2, when the screw rod 152 is rotated by the steering wheel 11, the engagement between the screw rod 152 and the rack 153 causes the rack 153 to synchronously move. Thus, the rack 153 and the tie rod 16 coupled thereto are moved in the left-right direction to change the angular position or steering angle of the front wheel with respect to a moving direction of the vehicle. A spherical joint 161 that couples the tie rod 16 to the rack 153 comprises an anti-loosening washer 162, which, when the rack 153 and the tie rod 16 are moved to a limit position, is brought into contact with a distal free end 1511 of the housing 151. This defines the limit position, corresponding to the maximum steering angle of the front wheel with respect to the vehicle.

The conventional steering device 1, although effective in ensuring proper steering of the front wheels of the vehicle, suffers the following disadvantages:

(1) Since the anti-loosening washer 162 of the spherical joint 161 of the tie rod 16 frequently hits the front end 151 of the housing 151 due to the steering operation and since the housing 151 is commonly made of aluminum based alloys that are of low hardness, the front edge 1511 of the housing 151 of the steering gear box 151 is often subjected to undesired deformation or even being broken, and consequently, replacement of the gear box 151 must be done for repairing purposes.

(2) In case that the design or manufacturing of vehicle is changed and there is a need to set new limitation to the steering angle of the front wheels of the vehicle, a new mold is needed for molding new design housing 151 of the new gear box 15 so that a proper length of the housing 151 is provided to effect the desired new steering configuration. This certainly increases the overall costs of the steering gear box 15.

Thus, in view of the above-discussed drawbacks of conventional four-wheeled vehicle, the present invention is aimed to overcome the problems associated with the engineering change caused by the desire of modification of steering device to cope with different angular limitation of steering and the problems associated with the unacceptable durability of the conventional steering gear box 15 caused by the anti-loosening washer 162 of the spherical joint 161 of the tie rod 16 frequently hitting the free end 1511 of the housing 15 of the gear box 15.

SUMMARY OF THE INVENTION

The primary purpose of the present invention is to reduce the costs associated with engineering change of the setting for steering angle of front wheels of a vehicle and to enhance durability of the steering gear box of a steering device.

Thus, the present invention provides a steering device for use in a four-wheeled vehicle, comprising a steering wheel, a steering column, a lower column, and a steering gear box. The lower column has opposite ends that are respectively coupled via universal joints to the steering column and the steering gear box. The steering gear box comprises a housing in which a rack and a screw rod are accommodated. The rack has an end coupled to a tie rod by a spherical joint and the tie rod is jointed to a kingpin of a front wheel of the vehicle. Thus, when the steering wheel is rotated, the steering angle of the front wheel is changed to thereby change the moving direction of the vehicle. The steering device comprises a constraint mechanism comprising a step formed on an inside surface of the housing and a sleeve fit over the step. The sleeve functions to limit a travel of the tie rod with respect to the housing in order to set a constraint to the steering angle of the front wheel. In such an arrangement, change of the setting for maximum steering angle of the front wheel can be easily done by replacing the original sleeve with a new one having a different dimension to impose different limitation to the travel of the tie rod. In this way, change of the maximum steering angle of the front wheel is carried out in a simplified and low-cost manner.

The foregoing object and summary provide only a brief introduction to the present invention. To fully appreciate these and other objects of the present invention as well as the invention itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
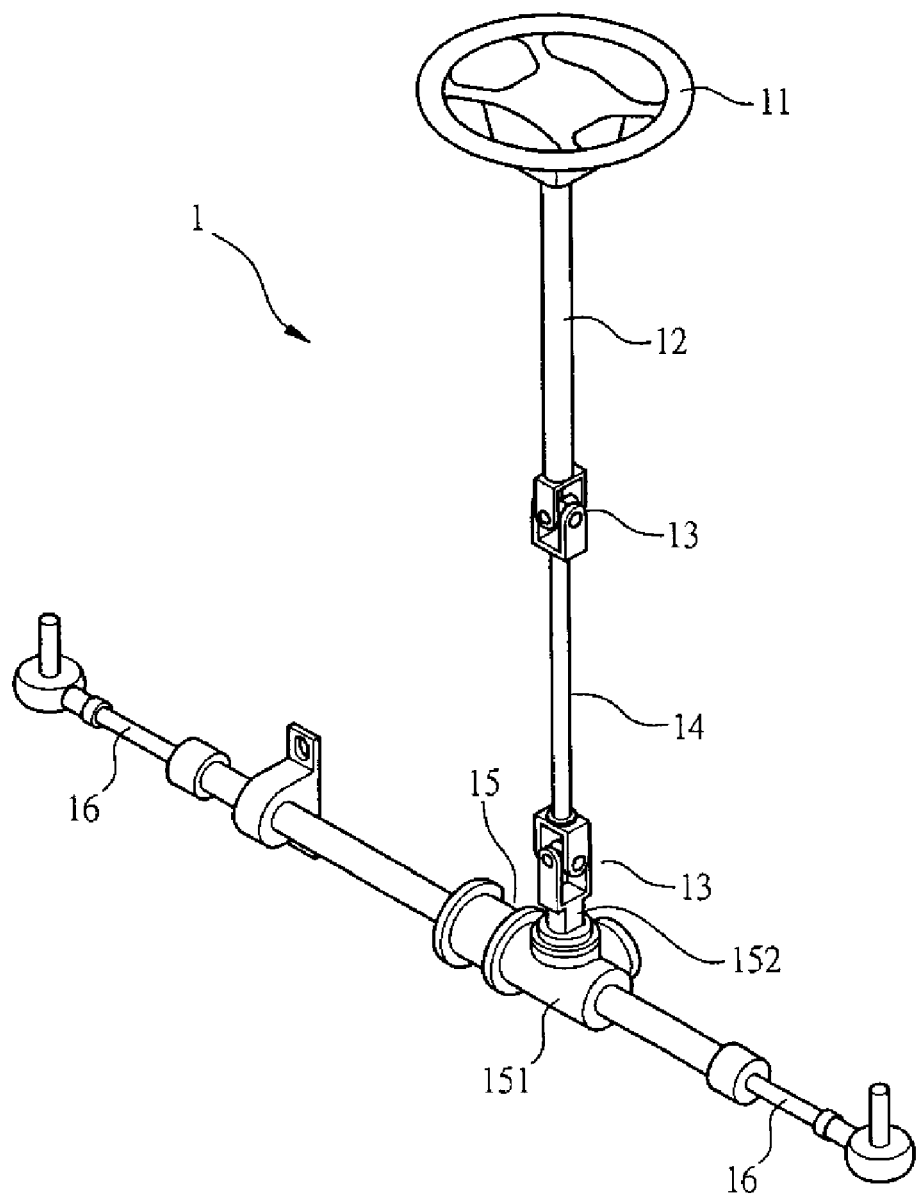
FIG. 1 is a perspective view of a conventional steering device for four-wheeled vehicle.
Figure 2:
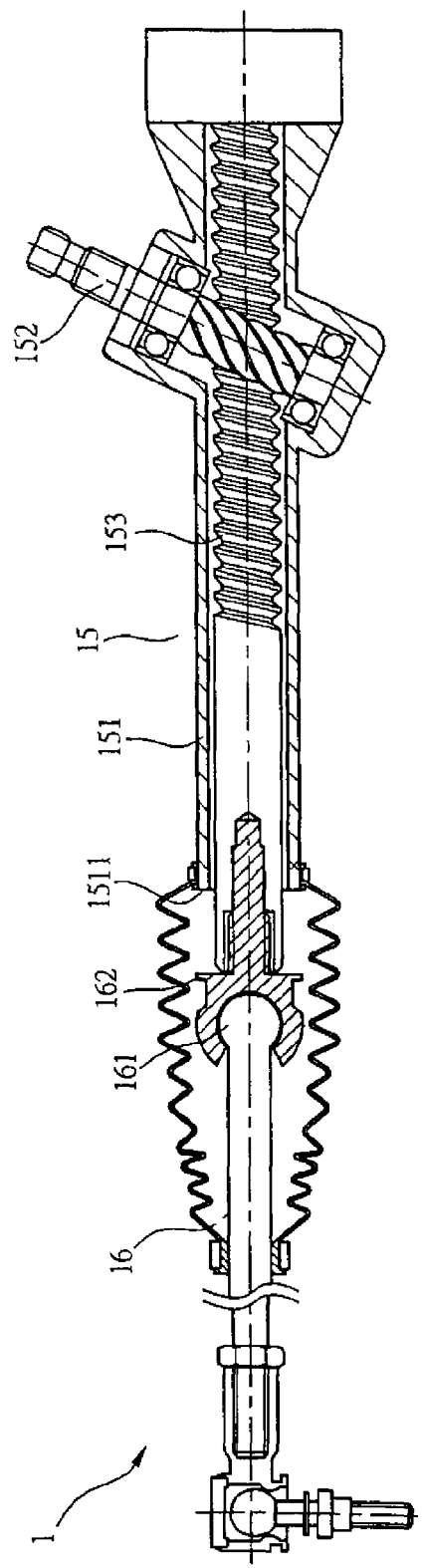
FIG. 2 is a cross-sectional view of one half of a steering bear box of the conventional steering device.
Figure 3:
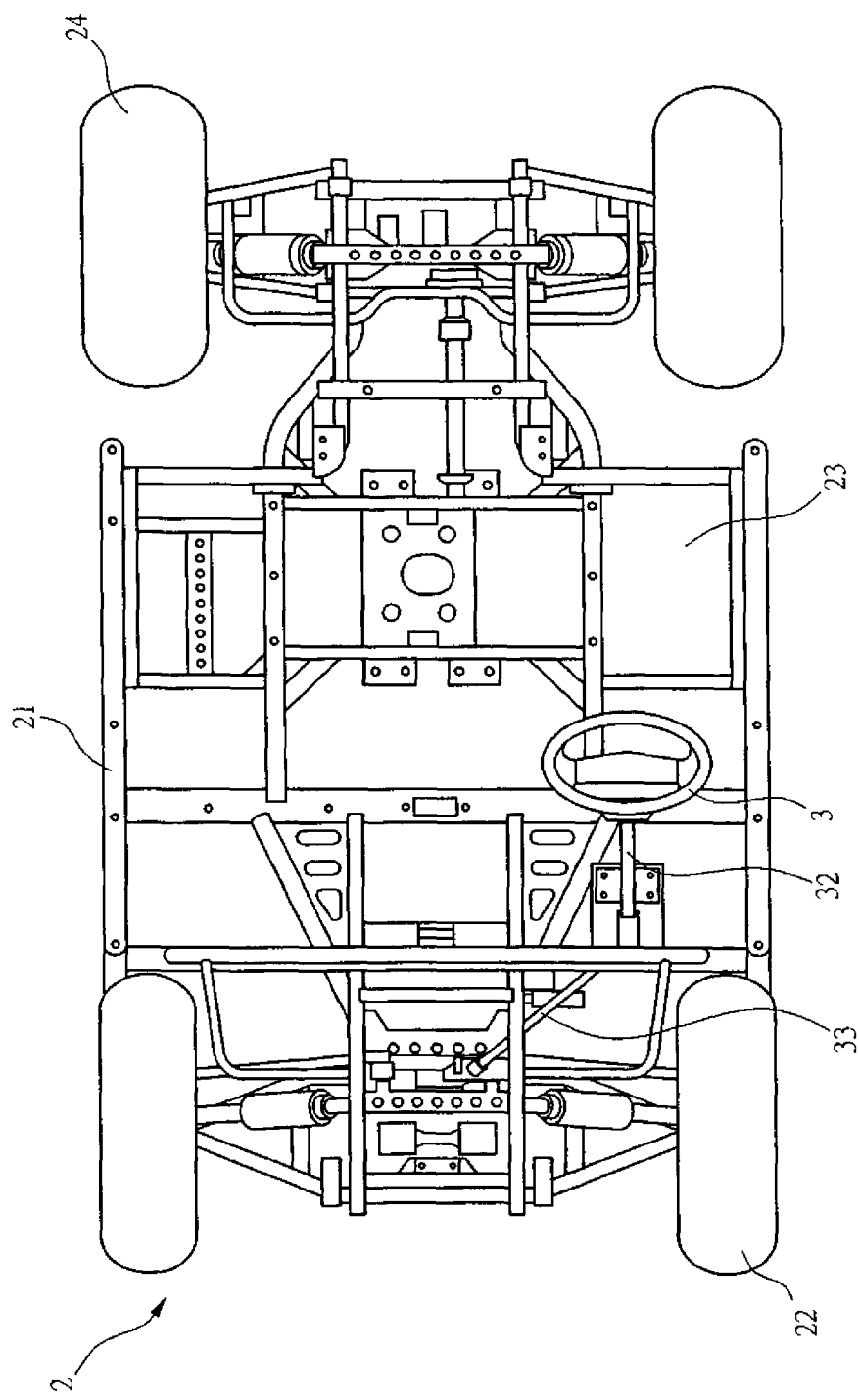
FIG. 3 is a schematic view illustrating the arrangement of a four-wheeled vehicle in which the present invention is embodied.

With reference to the drawings and in particular to FIG. 3, a four-wheeled vehicle, generally designated at 2, in which a steering device constructed in accordance with the present invention is embodied, comprising a chassis 21, the steering device 3, front wheels 22, a seat portion 23, and rear wheels 24. The steering device 3 is rotatably mounted to a front end portion of the chassis 21 and the front wheels 22 are operatively coupled to a lower end of the steering device 3. The seat portion 23 is arranged on the chassis 3 behind the steering device 3.

Figure 4:
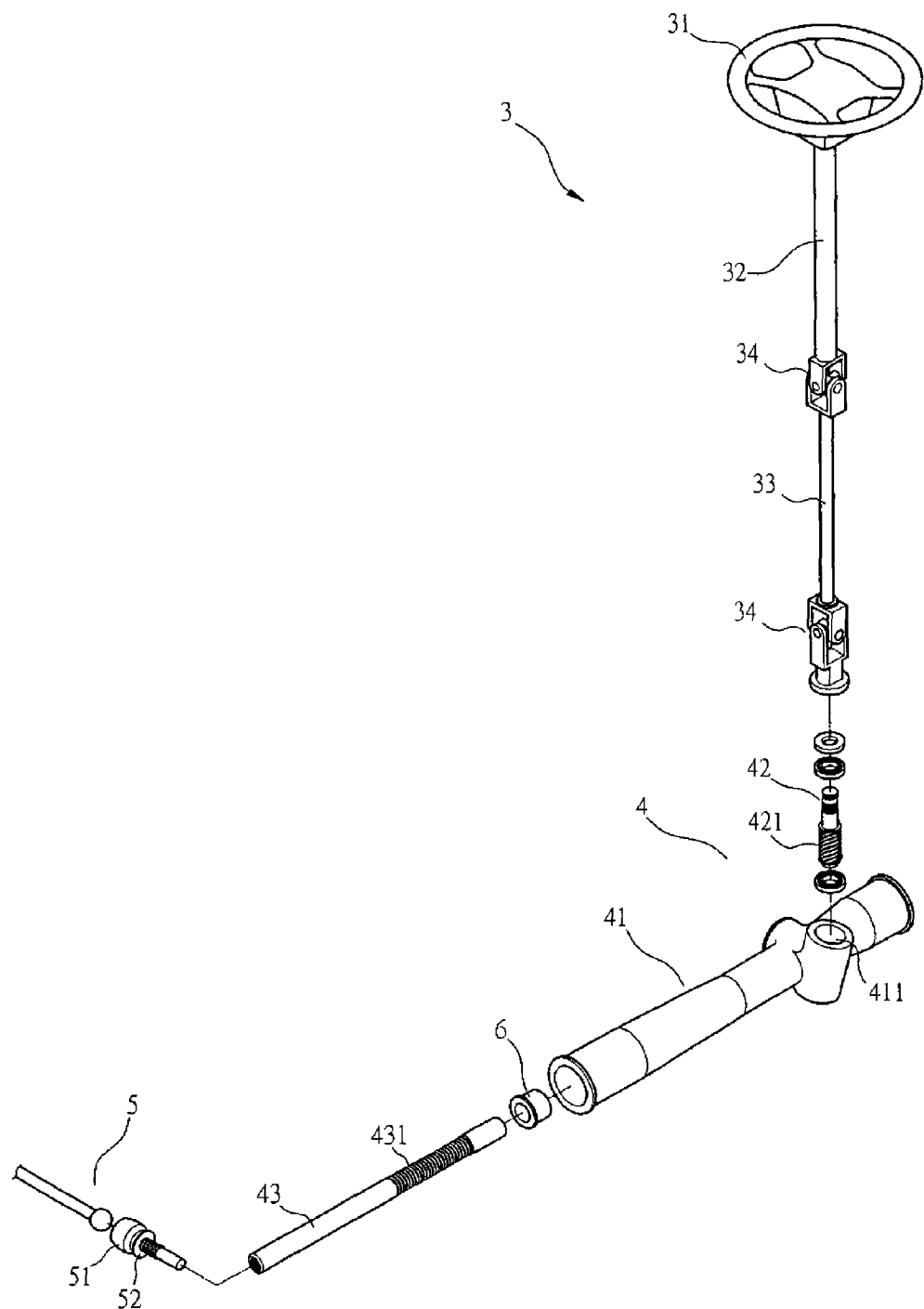
FIG. 4 is a perspective view, in exploded form, of a steering device for a four-wheeled vehicle constructed in accordance with the present invention.
Figure 5:
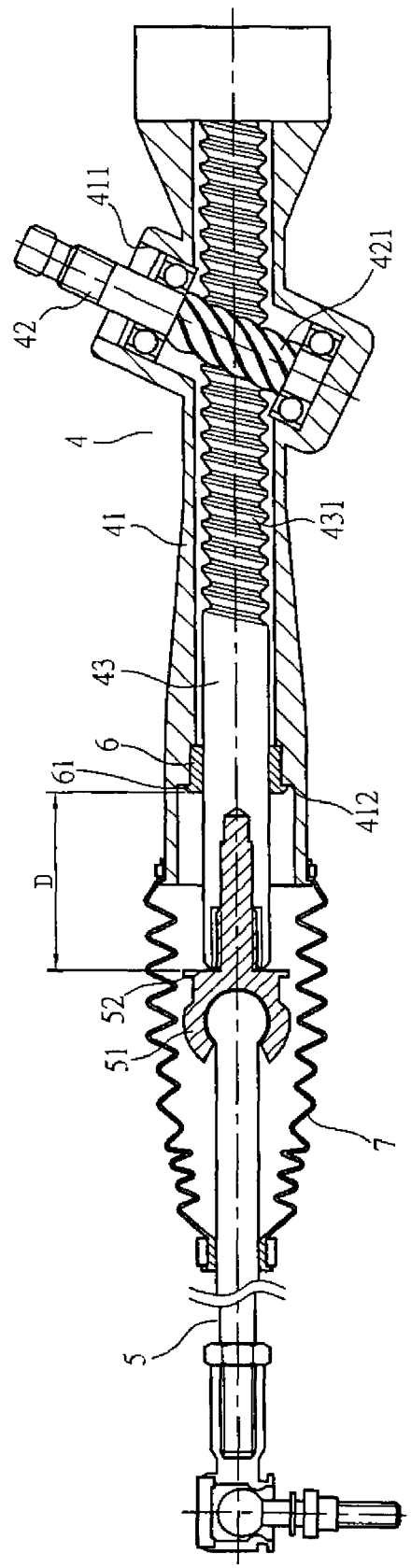
FIG. 5 is a cross-sectional view of one half of a gear box of the steering device shown in FIG. 4.

Also referring to FIGS. 4 and 5, the steering device 3 in accordance with the present invention, comprises a steering wheel 31, a steering column 32, a lower column 33, and a steering gear box 4. The steering wheel 31 is mounted to an upper end of the steering column 32 and the lower column 33 is coupled to a lower end of the steering column 32 via a universal joint 34. A lower end of the lower column 33 is coupled, via another universal joint 34, to a screw rod 42 of the steering gear box 4. The steering gear box 4 comprises a housing 41, which is in the form of an axially extending hollow tubular body. A fitting bore 411 is formed at a leftward offset position on the housing 41 and is inclined with respect to the housing 41. The housing 41 accommodates a rack 43 and the screw rod 42 therein. The rack 43 comprises a toothed section 431 that extends in an axial direction of the housing 41 and is received in the housing 41. The screw rod 42 has a lower end forming a toothed section 421 and extends through the fitting bore 411 into the housing 41 so that the toothed section 431 of the rack 43 and the toothed section 421 of the screw rod 42 inter-engage each other inside the housing 41. Opposite ends of the rack 43 are respectively connected to steering tie rods 5 by spherical joints 51. Each spherical joint 51 is provided with an anti-loosening washer 52 that is fit over a stem portion of the spherical joint 51 that is connected to the rack 43 and preferably surrounds the spherical joint 51, at least partly. A dust-protection boot 7 encloses the connection between the tie rod 5 and the rack 43 inside the housing 41 to block dust and/or humidity from entering the housing 41. The tie rods 5 are also coupled to the kingpins (not shown) of the front wheels 22 of the four-wheeled vehicle 2. Further, the housing 41 forms on an inside surface thereof a step 412, which can be a circumferential shoulder. A sleeve 6 is fit over the step 412 and fixed thereto by having an end rim 61 positioned against the step 412. The sleeve 6 is made of a high-hardness metallic material to function as a support for bearing the movement of the rack 43 inside the housing 41, which prevents the rack 43 from contacting and thus causing wear of the housing 41.

When the steering wheel 31 is rotated, the steering column 32 and the lower column 33 are rotated simultaneously. The screw rod 42 in turn drives the movement of the rack 43 within the housing 41 in a left-right direction. When the rack 43 undergoes the left-right direction movement, the tie rods 5 are caused to move in the left-right direction too and the tie rods 5 in turn drive the front wheels 22 to make change in steering angle or angular position of the front wheels 22 with respect to a moving direction of the vehicle 2 and thus changes the moving direction of the vehicle 2.

Figure 6:
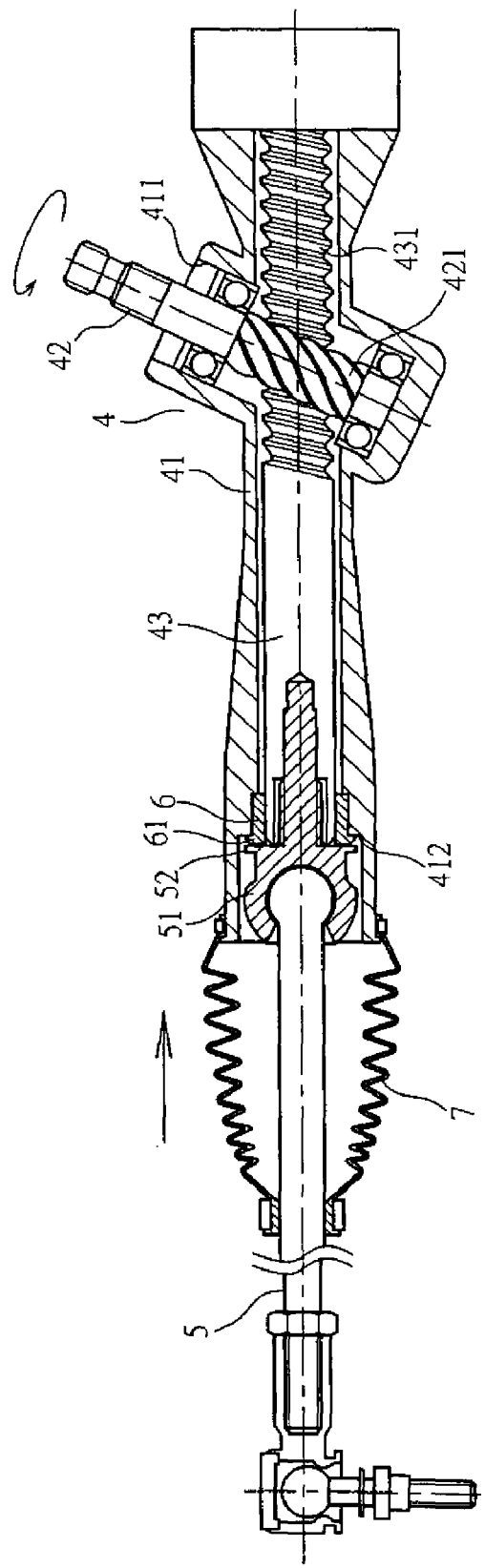
FIG. 6 is a cross-sectional view illustrating the operation of the steering device in accordance with the present invention.

Also referring to FIGS. 5 and 6, the operation of the steering gear box 4 will be explained. As stated above, the description is made with reference to one half (the right half) of the steering gear box 4. A constraint mechanism in accordance with the present invention imposes a limitation to the change of angular displacement of the front wheels to thereby set the maximum steering angle of the front wheels 22, which is associated with the distance D that the anti-loosening washer 52 of the spherical joint 51 of the tie rod 5 moves in a direction into the housing 41 before hitting the sleeve 6. FIG. 6 shows the condition that the anti-loosening washer 52 enters the housing 41 and is put in engagement with the sleeve 6, which defines the maximum limitation to the steering angle of the front wheel 22. The constraint mechanism for the steering device of the four-wheeled vehicle in accordance with the present invention is illustrated by abutting engagement between the anti-loosening washer 52 of the spherical joint 51 and the sleeve 6 (more specifically the end rim 61 of the sleeve 6) inside the housing 41 to set the limitation to the angular displacement of the front wheel 22.

Figure 7:
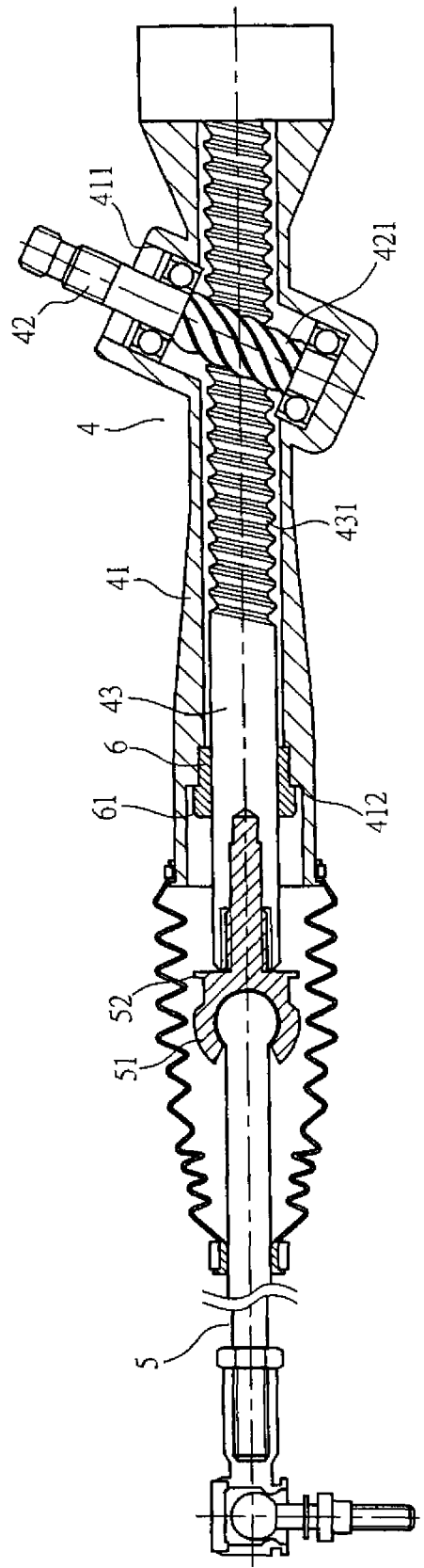
FIG. 7 is a cross-sectional view of one half of a gear box of a steering device constructed in accordance with another embodiment of the present invention.

Also, as shown in FIG. 7, when the requirement for the maximum steering angle of the front wheel 22 is changed, a replacement sleeve 6 having an end rim 61 of different thickness associated with the desired steering angle of the front wheel 22 is used to replace the original sleeve 6. This allows the operation of changing the setting for maximum steering angle of the front wheel 22 to be done in a simple and easy way.

The effectiveness of the present invention is that the housing 41 of the steering gear box 4 is provided therein a step 412 over which sleeve 6 is fit so that the anti-loosening washer 52 of the spherical joint 51 of the tie rod 5, when moving inward into the housing 41, is brought into abutting engagement with the sleeve 6 to set the maximum steering angle of the front wheel 22. With the sleeve 6 made of hard metallic material, the sleeve 6 is of excellence resistance against damage caused by being hit by the anti-loosening washer 52 of the spherical joint 51 that is moving inward into the housing 41, thereby protecting the housing 41 of the steering gear box 4 from damage caused by being hit by the anti-loosening washer 52 of the spherical joint 51 of the tie rod 5. Further, the change of setting for the maximum steering angle of the front wheel 22 can be easily done by replacing the sleeve 6 and thus the operation of setting changing is simplified and the costs reduced.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A steering device adapted to use in a four-wheeled vehicle, comprising a steering wheel, a steering column, a lower column, and a steering gear box, the lower column having opposite ends that are respectively coupled via universal joints to the steering column and the steering gear box, the steering gear box comprising a housing in which a rack and a screw rod are accommodated, the rack having an end coupled via a spherical joint to a tie rod, which is jointed to a front wheel of the vehicle, the spherical joint comprising an anti-loosening washer, wherein the steering device comprises a constraint mechanism comprising a step formed on an inside surface of the housing and a sleeve fit over the step, the sleeve being engageable with the anti-loosening washer of the spherical joint to form a constraint to an inward travel of the spherical joint of the tie rod into the housing so as to set a constraint to steering angle of the front wheel, and wherein the sleeve comprises and end rim positioned against the step inside the housing and engageable with the anti-loosening washer and the sleeve is releasably fit over the step so that the sleeve is replaced by a replacement sleeve having an end rim of different thickness.

2. The steering device as claimed in claim 1, wherein the anti-loosening washer surrounds the spherical joint.

3. The steering device as claimed in claim 1, wherein the rack and the screw rod are inclined with respect to each other.

4. The steering device as claimed in claim 1, further comprising a dust-protection boot enclosing a connection between the tie rod and the rack.

5. The steering device as claimed in claim 1, wherein the sleeve is made of a metallic material having a high hardness.

* * * * *